Nov. 17, 1942. H. T. PLATZ 2,302,251
APPARATUS FOR WELDING METAL PARTS
Filed Jan. 4, 1941 7 Sheets-Sheet 1
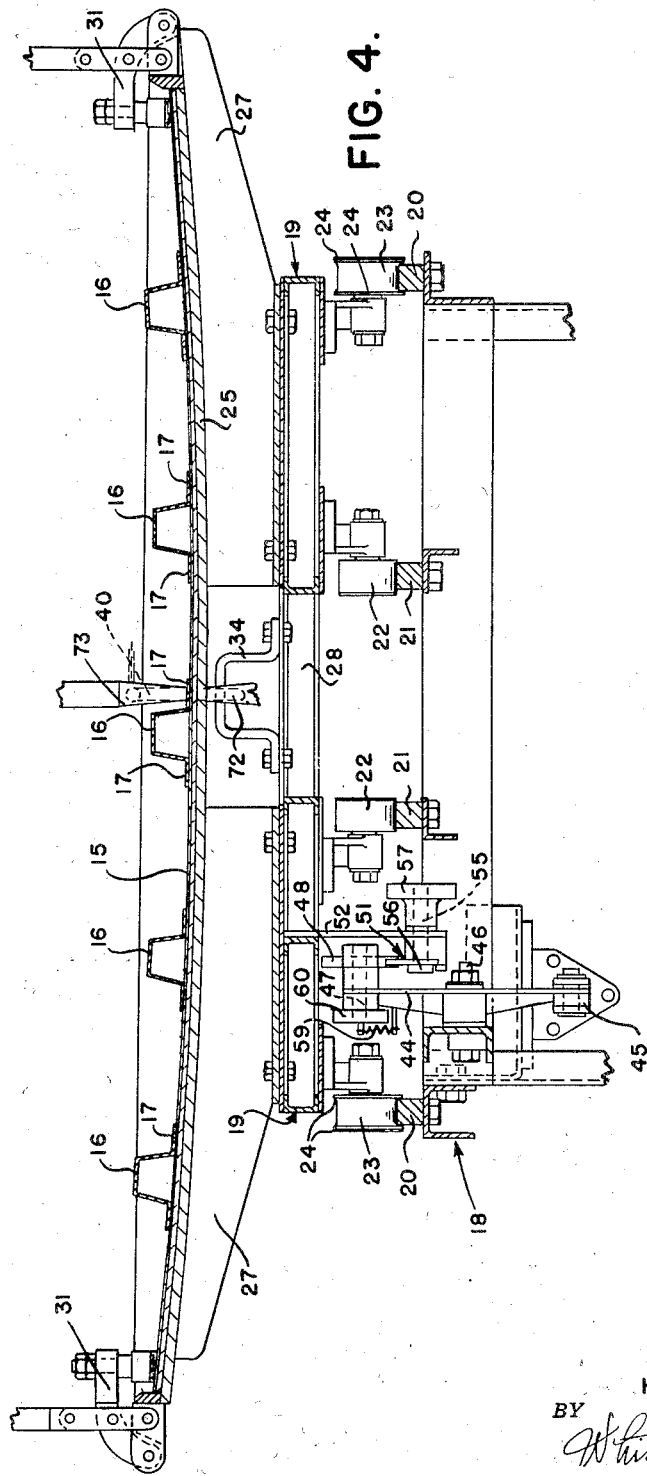
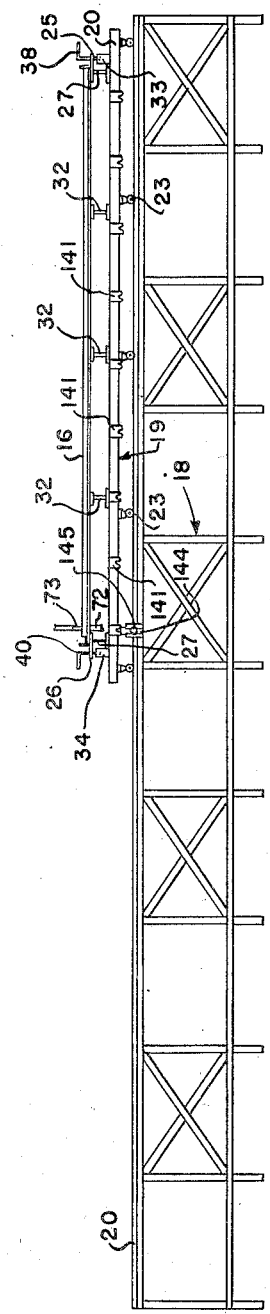
INVENTOR.
HENRY THOMAS PLATZ Nov. 17, 1942.   H. T. PLATZ   2,302,251
APPARATUS FOR WELDING METAL PARTS
Filed Jan. 4, 1941   7 Sheets-Sheet 2

INVENTOR.
HENRY THOMAS PLATZ
BY
ATTORNEYS

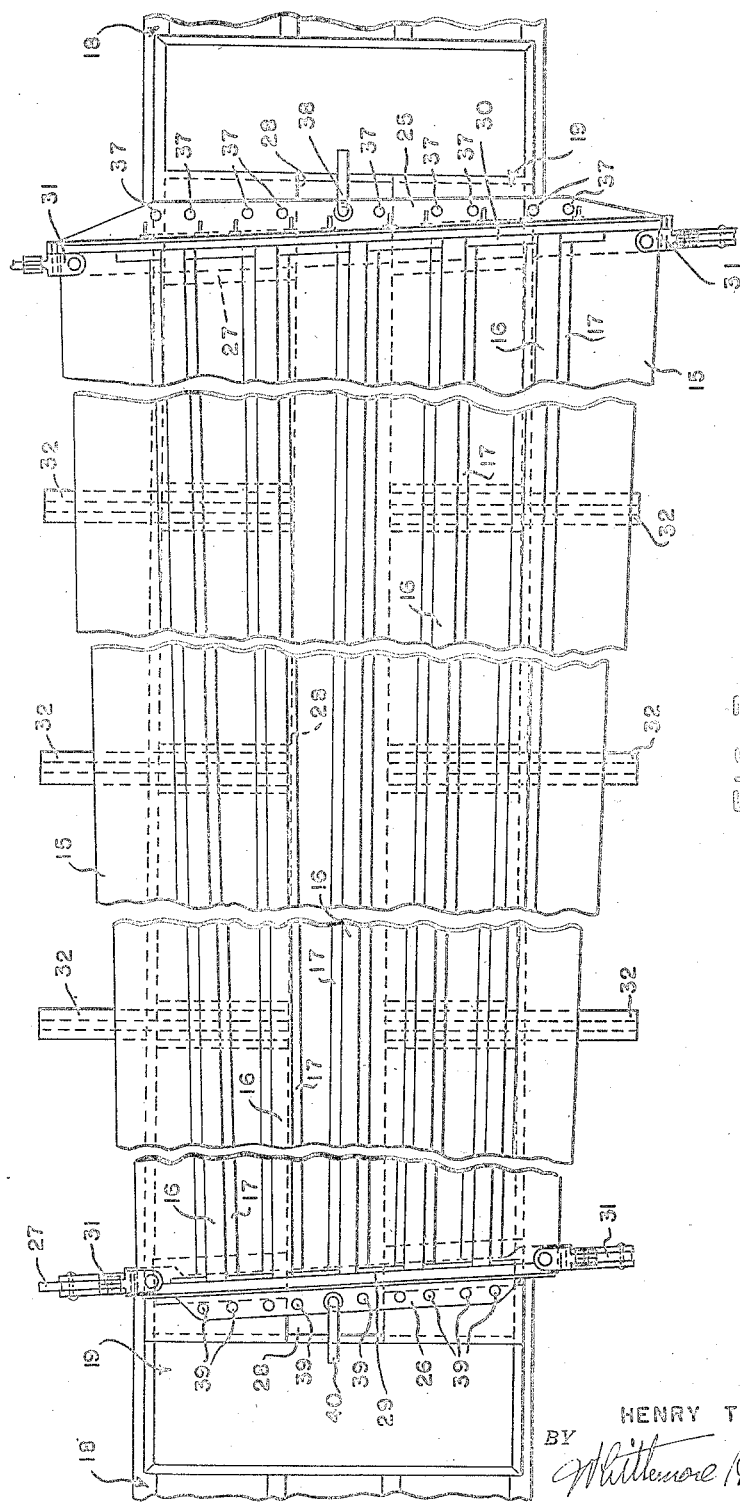

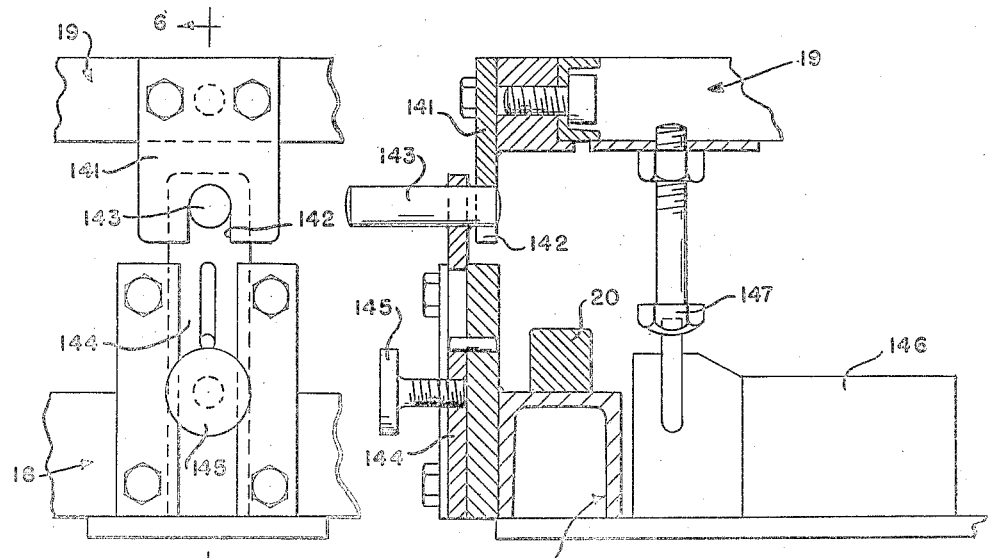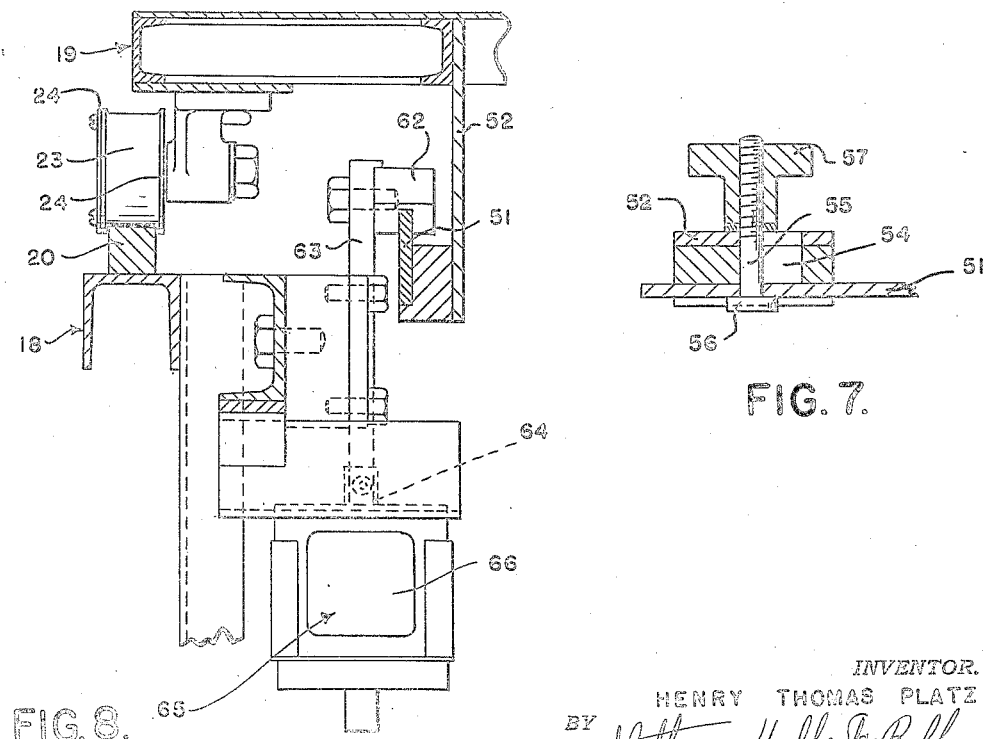

Nov. 17, 1942.   H. T. PLATZ   2,302,251
APPARATUS FOR WELDING METAL PARTS
Filed Jan. 4, 1941   7 Sheets-Sheet 5

INVENTOR.
HENRY THOMAS PLATZ
ATTORNEYS

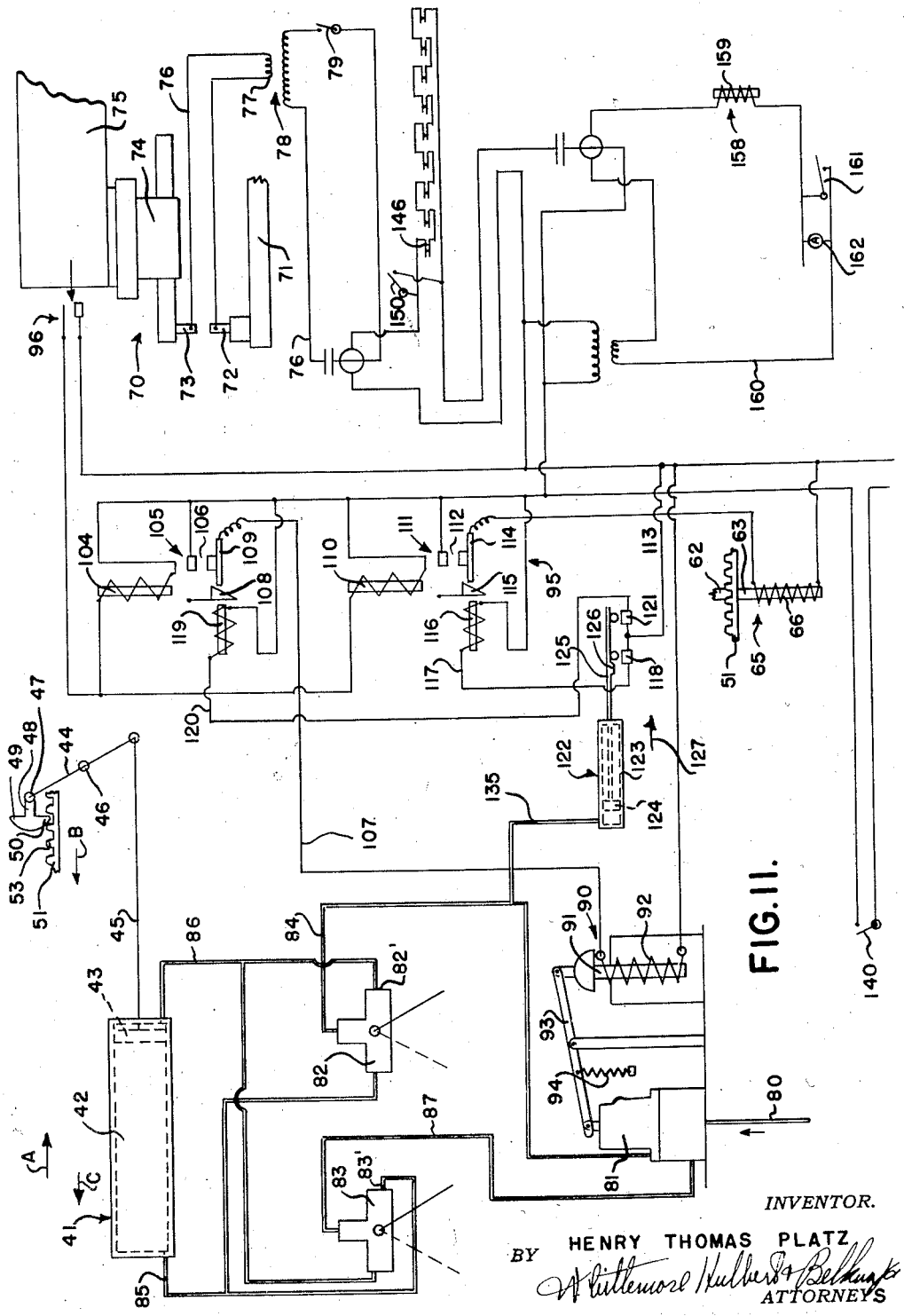

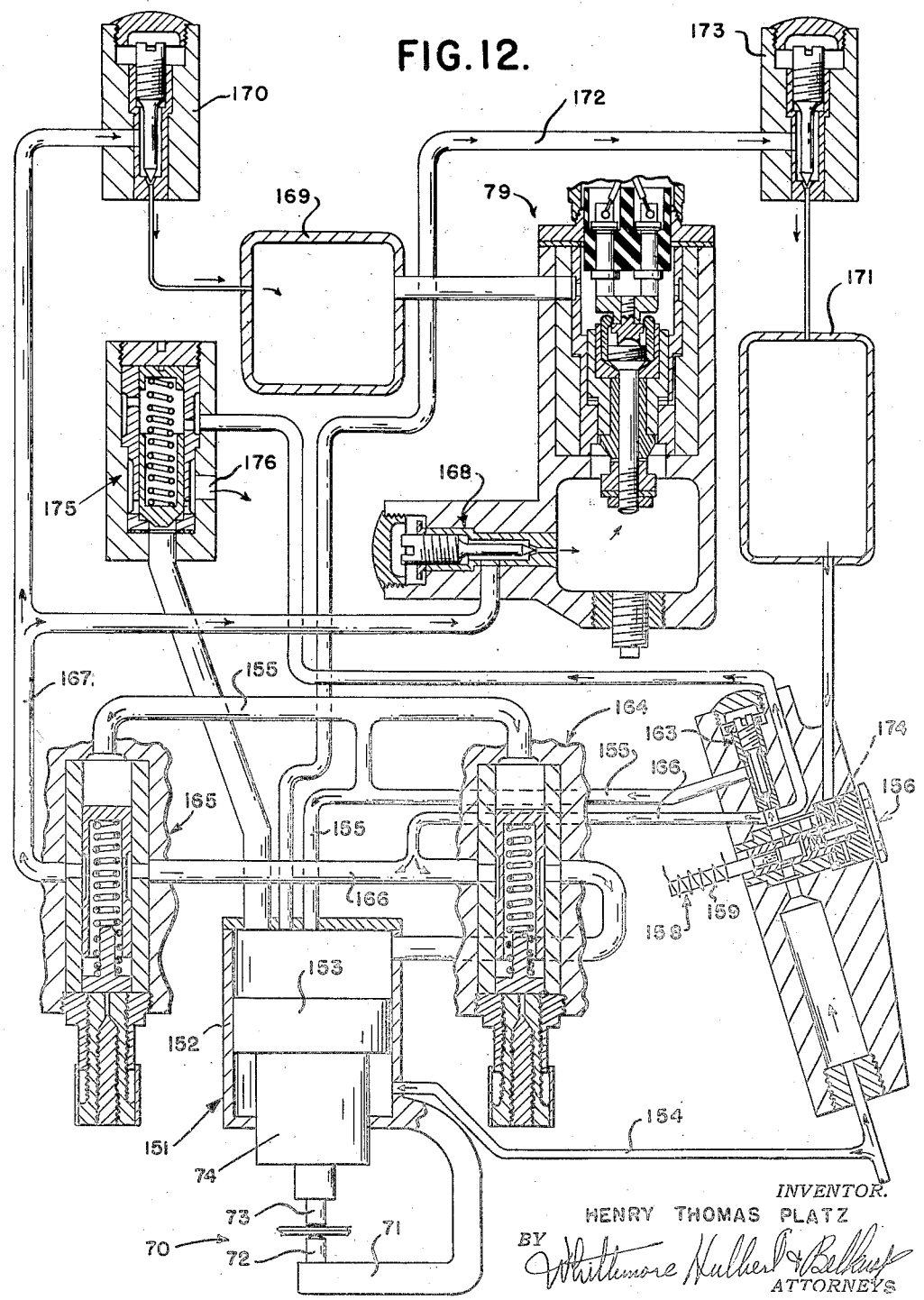

Patented Nov. 17, 1942

2,302,251

UNITED STATES PATENT OFFICE 2,302,251

APPARATUS FOR WELDING METAL PARTS

Henry Thomas Platz, Detroit, Mich., assignor to Briggs Manufacturing Company, Detroit, Mich., a corporation of Michigan Application January 4, 1941, Serial No. 373,177

14 Claims. (Cl. 219—4)

This invention relates to an improved method and apparatus for welding metal structures to form an integral assembly.

Although it will be apparent as this description proceeds that the present invention embodies numerous features which may be advantageously employed in practically every instance where a large number of welds are desired in a short space of time, nevertheless, the invention finds particular utility when used for the purpose of welding the metal covering or skin of aircraft wings to the reinforcing ribs. It has been customary in the past to secure the metal covering panels of aircraft wings to the reinforcing ribs by a multitude of closely spaced rivets. This tedious and costly practice is largely responsible for the high cost and low production rate of aircraft equipped with metal wing structures.

It is one of the principal objects of this invention to appreciably reduce the cost of and the time required to manufacture metal covered wing structures by providing a method and apparatus capable of producing a large number of welds in a relatively short space of time.

Another object of this invention is to provide an apparatus having a carriage adapted to support the parts of the aircraft wing to be secured together and having means for advancing the carriage by a step by step movement relative to the cooperating electrodes of a welder.

Another feature of this invention is to provide means for effecting relative movement of the electrodes into engagement with the work to be welded during the intervals of rest of the carriage and to provide means responsive to relative movement of the electrodes away from the work to initiate operation of the carriage indexing mechanism.

Still another object of this invention is to provide indexing mechanism for the carriage rendering it possible to move the carriage by a step by step movement in one direction to form one series of welds and adjustble to move the carriage by a step by step movement in the opposite direction to form a second series of welds with the welds in the second series positioned intermediate the welds in the first series.

A further feature of this invention is to provide means for locking the carriage against movement during the welding cycle with a latch automatically releasable from the carriage in response to relative movement of the welding electrodes away from the work and in timed relation to the indexing mechanism.

In addition to the foegoing, the present invention contemplates a relatively simple, inexpensive method of welding metal parts together. In general, this method consists in: (1) Assembling the parts to be welded by relatively positioning these parts in their specified locations; (2) tacking the parts together by preliminary welds predeterminedly spaced to hold the parts in proper assembled relationship; (3) forming a series of closely spaced welds along the work in a substantially straight line by relatively moving a welder and the work by a step by step movement; (4) relatively shifting the work and welder transversely to the direction of relative movement aforesaid and repeating the step referred to in item (3) to form a second row of closely spaced welds; and (5) repeating the above operations with the indexing mechanism adjusted to weld the work at points intermediate the welds aforesaid.

The present invention further contemplates relatively simple apparatus for carrying out the above steps of the method and having means for rendering the welder inoperative each time the electrodes of the welder register with one of the preliminary welds.

The foregoing as well as other objects will be made more apparent as this description proceeds, especially when considered in connection with the accompanying drawings, wherein:

Figure 1 is a fragmentary side elevational view of a welding apparatus constructed in accordance with this invention;

Figure 3 is a fragmentary plan view of the construction shown in Figure 1;

Figure 4 is a sectional view taken on the line 4—4 of Figure 2;

Figure 5 is a detail elevational view of the means for positioning the carriage when the preliminary welds are made;

Figure 6 is a sectional view taken on the line 6—6 of Figure 5;

Figure 7 is a sectional view taken on the line 7—7 of Figure 2;

Figure 8 is a sectional view taken on the line 8—8 of Figure 2;

Figure 11 is a diagram showing the control circuit for the apparatus; and

Figure 12 is a diagram illustrating the welder employed with the apparatus.

Figure 2:
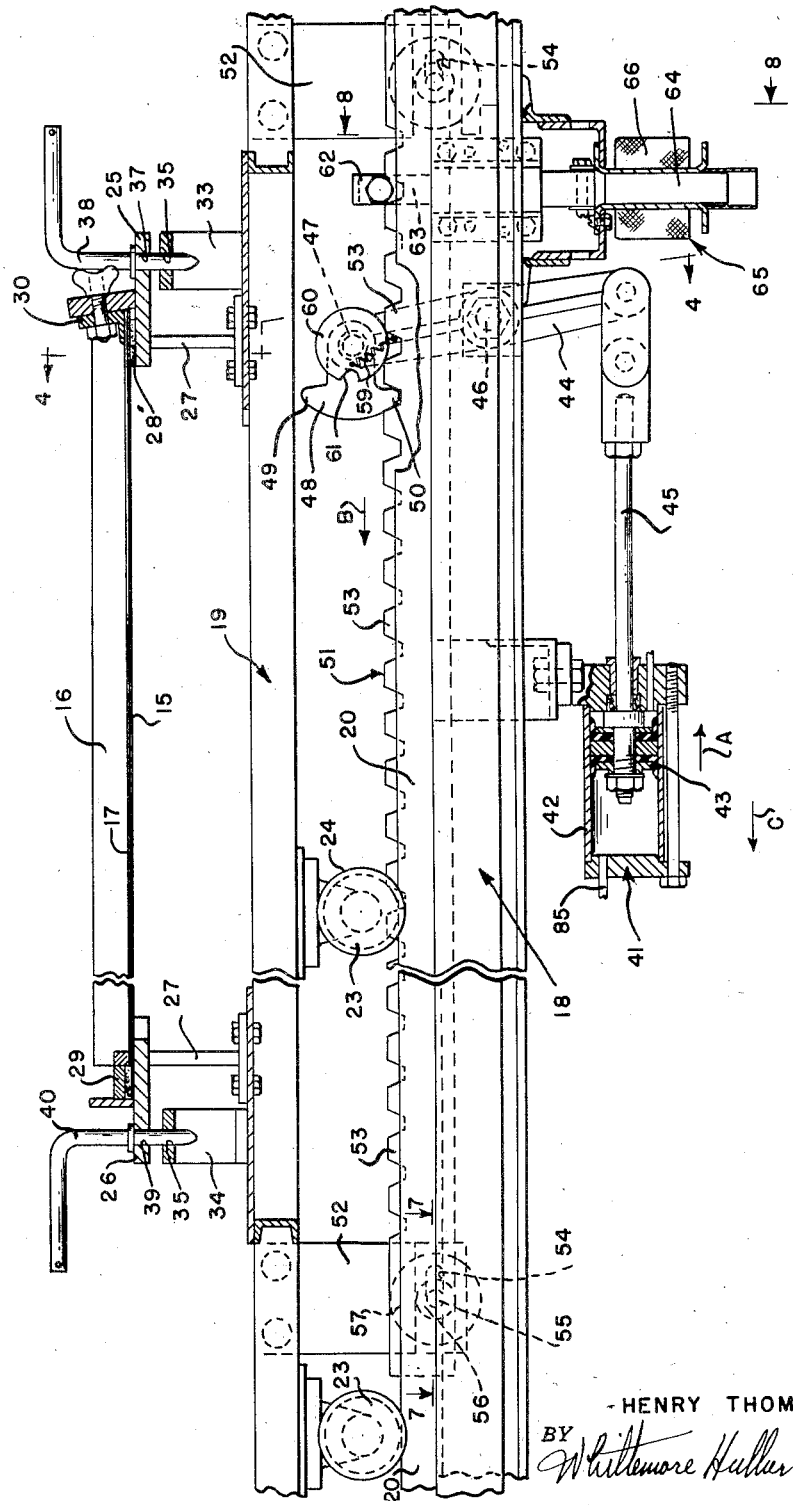
Figure 2 is a side elevational view partly in section of a portion of the apparatus shown in Figure 1.

As stated above, the method and apparatus forming the subject matter of this invention finds particular utility for use in the manufacture of metal wings for aircraft. These wings usually taper in width toward the tips thereof and comprise an outer skin formed of relatively light gauge metal sheets reinforced by ribs extending longitudinally of the wings. In Figures 1 to 4, inclusive, of the drawings, I have shown the lower section 15 of an aircraft wing skin having metal reinforcing ribs 16 extending longitudinally thereof. As shown particularly in Figure 4, the ribs 16 are of inverted channel-shaped cross section and each rib is formed with attaching flanges 17 extending laterally outwardly from the free edges of the side walls of the channels. The flanges 17 are adapted to have a flat engagement with the top surface of the skin section 15 and are secured to the latter by spot welding at a plurality of closely spaced points along the length of the flanges. In order to reduce the weight of the aircraft to a minimum, the wing skin and associated reinforcing ribs are usually formed of aluminum or an aluminum alloy. In the past, considerable difficulty has been encountered in welding metals having the characteristics of aluminum or aluminum alloy and for this reason it has been customary to secure the ribs to the skin by a multitude of closely spaced rivets. The problems presented in satisfactorily welding metals having the characteristics of aluminum or aluminum alloy are solved by the welder shown and described in my copending application Serial No. 363,936, filed, November 1, 1940, since matured into Patent No. 2,286,104, dated June 9, 1942, and this invention contemplates combining a welder of the above general type with a work handling fixture in such a manner that metal aircraft wings may be inexpensively produced at a much faster rate regardless of whether the parts thereof are formed of aluminum, aluminum alloy or some other metal.

With the above in mind, reference will now be made to the work handling fixtures shown in Figure 1 of the drawings as comprising a table 18 of suitable length and a carriage 19 supported on the table for movement longitudinally of the latter. Upon reference to Figure 4, it will be noted that the table 18 is provided with an outer pair of tracks 20 and with a pair of inner tracks 21. The two pairs of tracks are suitably supported on the table in a common horizontal plane and extend in parallel relationship longitudinally of the table.

The carriage 19 is supported on the tracks by means of rollers suspended from the carriage at spaced points throughout the length thereof. In detail the inner pair of tracks 21 are engaged by rollers 22 and the outer pair of tracks are engaged by rollers 23. The rollers 23 are provided with radially outwardly extending flanges 24 at opposite ends for respectively engaging the opposite sides of the tracks 20 to prevent lateral shifting movement of the carriage 19 during its travel relative to the table 18.

Removably supported on opposite ends of the carriage 19 is a pair of cradles 25 and 26. Both cradles are supported at the same elevation in vertically spaced relationship to the carriage by means of supports 27 bolted or otherwise suitably secured to the opposite ends of the carriage. As shown in Figure 4, each support 27 is formed of two sections and these sections are secured to the carriage with the inner ends thereof spaced from each other so as not to interfere with the center slot or passageway 28 extending for substantially the full length of the carriage 19 along the longitudinal center line of the latter.

The cradles merely rest on the upper edges of the supports 27 and the top surfaces of the cradles correspond in curvature to the transverse curvature of the skin section 15. It will also be noted that the top surfaces of the cradles are preferably lined with a nonmetallic insulating material 28' and the opposite ends of the skin section 15 rest upon the lining 28'. The ends of the reinforcing ribs 16 adjacent the cradle 26 are properly spaced from each other by means of a locating strip 29 suitably secured to the cradle 26. The opposite ends of the ribs 17 are properly spaced from each other by suitable clamps 30 carried by the cradle 25. It may also be pointed out at this time that the skin section 15 is clamped to the cradles by means of two pairs of toggle clamps 31. One pair of toggle clamps is carried by the cradle 25 for clamping opposite sides of the skin section to the cradle, and the other pair of toggle clamps is carried by the cradle 26 for clamping the opposite sides of the skin section 15 to the latter cradle. It follows from the above that the skin section 15 of the aircraft wing is effectively clamped to the two cradles and the reinforcing ribs 16 are located in their specified positions with respect to the skin section 15. The intermediate portions of the skin section 15 are supported at spaced points from the carriage 19 by supports 32 substantially the same in construction as the supports 27 secured to the carriage 19.

Although the cradles 25 and 26 merely rest upon the top edges of the supports 27, nevertheless, provision is made herein for connecting the cradles to the carriage 19. In detail a pair of inverted U-shaped brackets 33 and 34 are secured to opposite ends of the carriage 19 on opposite sides of the longitudinal center line of the carriage and the base portion of each bracket is formed with an opening 35 therethrough having its center located in a common vertical plane with the longitudinal center line of the carriage. Upon reference to Figure 2, it will be noted that a portion of the cradle 25 extends over the base of the U-shaped bracket 33 and is formed with a plurality of openings 37 therethrough. The openings 37 are spaced from each other in the direction of length of the cradle 25 and are adapted to successively register with the opening 35 through the base of the bracket 33 upon indexing the cradle 25 transversely of the carriage 19. The diameter of the openings 37 in the cradle 25 approximates the diameter of the opening 35 in the base of the bracket 33 so as to permit the cradle 25 to be connected to the carriage 19 by inserting a pin 38 through the opening 35 and the registering opening 37 in the cradle.

The cradle 26 is connected to the carriage 19 in substantially the same manner as the cradle 25. As shown in Figure 2, a portion of the cradle 26 extends over the base of the bracket 34 and is formed with a plurality of openings 39 spaced from each other in the direction of length of the cradle 26 and successively registerable with the opening 35 in the bracket 34 as the cradle 26 is indexed transversely of the carriage. The openings 39 correspond in number to the number of openings 37 in the cradle 25 and are also adapted to receive a pin 40. The pin 40 is adapted to extend into the opening 35 in the base of the bracket 34 and cooperates with the pin 38 to secure the work to the carriage.

Upon reference to Figure 3, it will be noted that the openings 37 in the cradle 25 are arranged in pairs with the openings in each pair positioned directly opposite the adjacent ends of the attaching flanges 17 on one of the reinforcing ribs 16. In other words, an opening 37 is formed in the cradle 25 in alignment with each attaching flange 17 on the ribs 16. The same arrangement is carried out in connection with the carriage 26, although the spacing between the pairs of openings 39 in the cradle 26 is less than the spacing between the pairs of openings 37 in the cradle 25 by an amount predetermined to compensate for the taper of the skin section 15.

It follows from the foregoing construction that each attaching flange 17 on the ribs 16 may be selectively located on the carriage with the longitudinal line of the attaching flange in a common plane with the longitudinal center line of the carriage. In other words, when the end cradles are located by the pins relative to the carriage, one attaching flange on one of the ribs extends parallel to the path of travel of the carriage 19, and the attaching flanges on the ribs may be successively moved to the above position by merely indexing the cradles transversely of the carriage 19. Thus, by supporting the cooperating electrodes of a stationary welder on the longitudinal center line of the carriage, each of the attaching flanges 17 on the ribs 16 may be welded to the skin section 15 by indexing the carriage 19 relative to the welder in opposite directions. It will, of course, be understood that after the carriage has been moved by a step by step movement to the end of its travel in one direction, the cradles are indexed transversely of the carriage to align another attaching flange with the longitudinal center line of the carriage before the latter is indexed in the opposite direction.

The carriage 19 is indexed relative to the table 18 by means of a fluid motor 41 having a cylinder 42 and having a double acting piston 43 reciprocably mounted in the cylinder. The piston 43 is operatively connected to the lower end of a rock arm 44 by means of a connecting rod 45. The rock arm 44 is pivotally supported intermediate the ends on a stud 46 carried by the table 18 and the upper end of the rock arm 44 is fashioned to form a support for a rock shaft 47 having its axis parallel to the axis of rocking movement of the arm about the stud 46.

Secured to the inner end of the rock shaft 47 is an indexing pawl 48 having opposed teeth 49 and 50. The teeth on the pawl selectively engage a rack bar 51 extending for substantially the full length of the carriage and having the opposite ends suspended from the carriage by means of brackets 52. The upper edge of the rack bar 51 is fashioned to provide a plurality of teeth 53 of a dimension predetermined to engage either of the teeth 49 and 50 on the pawl 48. The teeth 53 are spaced from each other longitudinally of the rack bar 51 a distance corresponding to the spacing of the welds desired.

In the present instance, however, the spacing between adjacent teeth 53 on the rack bar is equal to twice the distance between the adjacent welds of the finished product. In other words, the arrangement is such that when the carriage 19 is moved by the indexing mechanism to the end of its travel in one direction, the resulting welds are spaced from each other twice the specified distance. As a consequence, it is necessary to eventually weld between the adjacent welds secured by the above indexing movement of the carriage in order to procure the specified spacing of the welds. As will be more fully hereinafter set forth, this procedure is preferred in cases where it is necessary to group the welds in relatively close proximity to each other, since it permits the metal to cool to some extent between adjacent welds and, as a result, more effective welds are obtained. In accordance with the present invention, the rack bar 51 is connected to the brackets 52 in such a manner as to permit the rack bar to be shifted longitudinally relative to the carriage the distance required to weld the work at points intermediate the adjacent welds obtained by the original setting of the bar. As shown in Figures 2, 4 and 7, the opposite ends of the rack bar are formed with openings adapted to receive suitable studs 55 carried in elongated slots 54 formed in the brackets 52. The outer ends of the studs are provided with heads 56 adapted to abut the adjacent side of the rack bar and the inner ends of the studs are threaded for receiving a suitable knob 57. The construction is such as to permit the opposite ends of the rack bar to be clamped to the brackets 52 in either of the two positions referred to above.

It has previously been stated that the teeth 53 on the rack bar are dimensioned to selectively receive the teeth 49 and 50 on the pawl 48. The arrangement is such that when the pawl 48 is swung to the position thereof shown in Figure 2 and the piston 43 is moved in the direction of the arrow A, the carriage is indexed by the pawl in the direction of the arrow B, and movement of the piston 43 in the direction indicated by the arrow C permits the tooth 50 on the pawl to engage the next adjacent tooth on the rack bar. When the carriage is indexed to the end of its path of travel in the direction of the arrow B, the pawl is swung to a position wherein the tooth 49 successively engages the teeth 53 on the rack bar, with the result that the carriage is indexed to the opposite end of its path of travel by the fluid motor 41.

The pawl 48 is yieldably retained in either of its two operative positions with respect to the rack bar 51 by means of a spring 59 having the lower end anchored on the rock arm 44 at substantially the center line of the arm and having the upper end connected to a disc 60 adjacent the periphery of the latter. The disc 60 is secured to the outer end of the rock shaft 47 so as to move as a unit with the pawl 48. As shown in Figure 2, the upper end of the spring 59 is connected to the disc 60 in such relationship to the pawl that it effectively holds the pawl in either of its two adjusted positions with respect to the rack bar. If desired, the disc 60 may be provided with a recess 61 in the periphery thereof for receiving a suitable tool to permit conveniently rocking the pawl 48 from one position to the other.

Provision is also made herein for positively locking the carriage in each of its various positions of adjustment relative to the table. Upon reference to Figures 2 and 8, it will be noted that the locking means comprises a wedge-shaped dog 62 secured to the upper end of a vertical slide 63 and adapted to snugly engage the teeth 53 of the rack bar. The slide 63 is supported on the table 18 for sliding movement vertically relative to the table and the lower end 64 of the slide forms the core of an electromagnet 65. The arrangement is such that the dog 62 is urged by gravity into locking engagement with the rack bar 51 and is released from the rack by energizing the coil 66 of the electromagnet 65. As will be more fully hereinafter set forth, the coil 66 of the electromagnet is energized to release the dog from the rack 51 prior to operation of the indexing mechanism and the electromagnet is deenergized as soon as the indexing of the carriage is initiated so that the dog falls back into engagement with the rack bar and drops into the next adjacent tooth space when indexing of the carriage is completed.

Supported to one side of the table 18 intermediate the ends of the latter is a welder 70 having an arm 71 extending beneath the carriage 19 and supporting a fixed electrode 72 in such a position that the axis of the electrode is in a common plane with the longitudinal center line of the carriage. As shown in Figure 4, the electrode 72 extends through the slot or passageway 28 in the carriage and the upper end of the electrode engages the underside of the skin section 15.

Cooperating with the fixed electrode 72 is a movable electrode 73 carried by a vertically reciprocal head 74 which, in turn, is slidably mounted on an arm 75 extending from the welder over the top of the carriage 19. The arrangement is such that the top electrode 73 is supported in axial alignment with the bottom electrode 72 for movement toward and away from the latter.

During the intervals of rest of the carriage 19, the electrode 73 is moved toward the cooperating electrode 72 to clamp the work to be welded therebetween and is moved away from the electrode 72 upon completion of the welding cycle to release the work prior to operation of the indexing mechanism to advance the carriage for the next weld. Upon reference to Figure 11, it will be noted that the electrodes are connected in a circuit 76 including the secondary coil 77 of the welding transformer 78 and this circuit is controlled by a switch 79. As will be presently set forth, the switch 79 is closed after the electrode 73 is moved into engagement with the work and is automatically opened at the end of the specified welding period.

As stated above, the carriage 19 is indexed upon movement of the electrode 73 away from the work by the head 74 and the indexing of the carriage is accomplished by the fluid motor 41 previously discussed. As shown in Figure 11, a fluid pressure supply line 80 communicates with opposite ends of the cylinder 42 through the medium of a four-way valve 81 and a pair of three-way reversing valves 82 and 83. Assuming that it is desired to move the piston 43 in the direction of the arrow A when the valve 81 is opened, the reversing valve 82 is adjusted to permit fluid pressure to flow through the conduit 84 into the left hand end of the cylinder 42 (as viewed in Figure 11) through the conduit 85. The reversing valve 83, on the other hand, is adjusted to permit fluid under pressure in advance of the piston 43 to exhaust into the passage 86 through the reversing valve 83 to the exhaust passage 87. In the two above mentioned positions of the reversing valves, the port 82' of the valve 82 and the port 83' of the valve 83 are closed. As a result, the piston 43 is moved in the direction of the arrow A and the carriage 19 is indexed in the direction of the arrow B.

At the end of each indexing movement of the carriage 19 in the direction of the arrow B, the valve 81 is moved to connect the passage 87 to the fluid pressure supply line 80 and to connect the passage 84 to the exhaust. As a result, a reversal of the flow of the fluid under pressure in the system is effected and the piston 43 is returned to its retracted position. Movement of the piston 43 to its retracted position causes the tooth 50 on the pawl 48 to engage the next adjacent tooth on the rack bar 51.

The four-way valve 81 is operated by an electromagnet 90 having a core 91 and having a coil 92 surrounding the core. The coil 92 is electrically connected in the control circuit in a manner to be more fully hereinafter set forth, and the core is mechanically connected to the valve plunger of the four-way valve 81 by means of a link 93. The arrangement is such that when the coil 92 is energized, the valve 81 is adjusted to open communication between the fluid pressure supply line 80 and the conduit 84. In the above position of the valve, the conduit 87 is connected to the exhaust so as to permit the indexing piston 43 to move in the direction of the arrow A. On the other hand, when the coil 92 is deenergized, the valve plunger is operated by a spring 94 to connect the fluid pressure supply line 80 with the conduit 87 and to connect the conduit 84 to the exhaust. As a result, the piston 43 is returned to its retracted position by fluid pressure.

As previously stated, when the carriage 19 is indexed in the direction of the arrow B to the end of its path of travel, it is necessary to move the same in the opposite direction by a step by step movement. This is accomplished by swinging the pawl 48 to a position wherein the tooth 49 on the pawl cooperates with the teeth 53 on the rack 51 and the operation of the fluid motor is reversed so that the power stroke of the piston is in the direction of the arrow C. In order that the electromagnet 90 will have the same effect on the valve 81 when indexing the carriage 19 in the opposite direction, the reversing valves 82 and 83 are adjusted so that when the valve 81 is opened by the electromagnet 90 fluid under pressure flows through the valve 82 to the right-hand end of the cylinder 42, as viewed in Figure 11. The fluid under pressure in advance of the piston is exhausted from the left-hand end of the cylinder 42 through the valve 83 to the exhaust passage 87.

Figure 9:
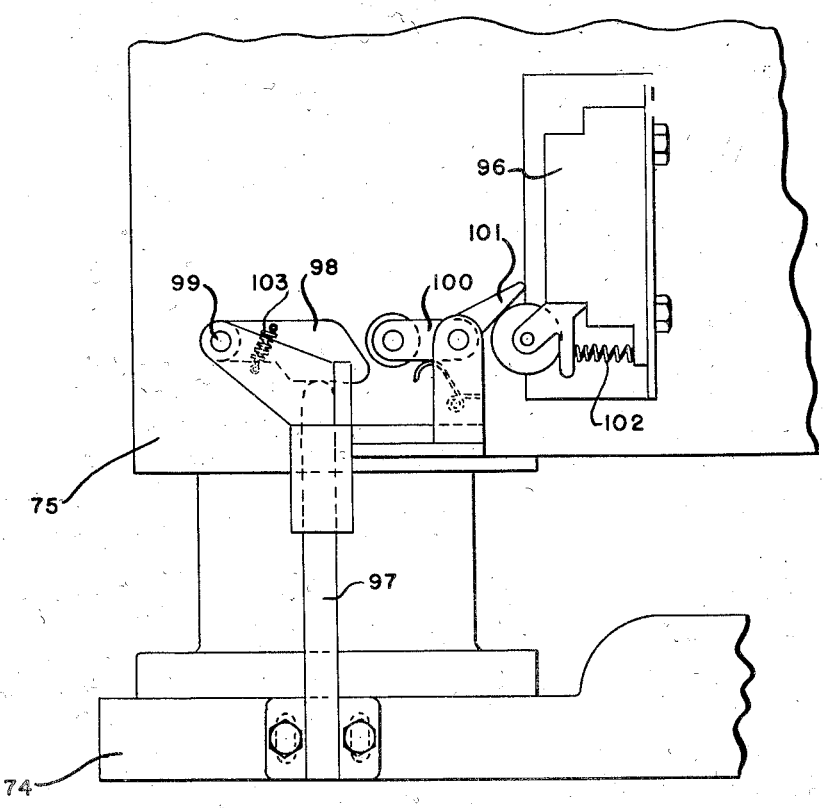
Figure 9 is a fragmentary elevational view of the welder showing a part of the work carriage control mechanism.

The electromagnet 65 for releasing the carriage lock 62 from the rack bar is, of course, operated at the same time as the electromagnet 90 so that the lock will be released when the carriage 19 is indexed. In fact, both the coil 66 of the electromagnet 65 and the coil 92 of the electromagnet 90 are arranged in the same control circuit, designated in Figure 11 by the reference character 95. The control circuit 95 is normally open and is controlled by a limit switch 96 supported on the arm 75 of the welder. Upon reference to Figure 9, it will be noted that the limit switch 96 is closed as the electrode carrying head 74 moves in a direction away from the work. For accomplishing this result, a rod 97 is adjustably secured to the head 74 for movement therewith as a unit and the upper end of the rod abuts a cam 98 pivotally supported on the arm 75 by means of a pivot pin 99. The free end of the cam is adapted to engage one end of a finger 100 pivotally supported intermediate the ends thereof on the arm 75 and having the opposite end 101 operatively associated with the limit switch 96.

The above construction is such that when the rod 97 is moved upwardly by the electrode carrying head 74, the cam 98 is swung about the pin 99 and, in turn, operates the finger 100 to close the limit switch 96. The cam 98 merely trips the finger 100 to close the switch 96 and does not serve to hold the switch closed. As a result, the switch 96 is immediately opened by the spring 102 and, of course, the cam is returned to its initial starting position by the spring 103 when the electrode carrying head 74 is again moved toward the work.

It follows from the above that the control circuit 95 is merely momentarily closed by the limit switch 96. However, the circuit is closed long enough to energize the electromagnet 104 of a relay 105 to close a switch 106 arranged in an auxiliary circuit 107 which includes the load coil 92 of the electromagnet 90. As soon as the switch 106 is closed, a latch 108 is moved into engagement with the switch contact arm 109 and holds the switch in its closed position. As a result, the electromagnet 90 is energized to operate the valve 81 and effect an indexing movement of the carriage 19.

It will also be observed from Figure 11 that closing of the control circuit 95 by the switch 96 energizes an electromagnet 110 of a second relay 111 having a switch 112 arranged in an auxiliary circuit 113 which includes the coil 66 of the electromagnet 65. The movable switch contact arm 114 is latched in switch closing position by means of a latch member 115. Thus, it will be seen that the electromagnet 65 is energized to release the carriage lock 62 from the rack 51 at the time the valve 81 is operated by the electromagnet 90 to index the carriage.

It will, of course, be understood that the auxiliary circuits 107 and 113 must be opened to deenergize the electromagnets 65 and 90 to respectively permit the carriage lock 62 to reengage the rack bar 51 and to provide for return movement of the pawl 48. For accomplishing the above results, an electromagnet 116 is arranged in a circuit 117 with a limit switch 118. The arrangement is such that when the limit switch 118 is closed, the electromagnet 116 is energized to release the latch 115 from the relay switch contact arm 114 permitting the latter to move away from its cooperating contact and thereby open the circuit 113. Opening of the circuit 113 deenergizes the electro-magnet 65 and permits the carriage lock 62 to drop downwardly into engagement with the rack bar 51.

The latch 108 is adapted to be released from the relay switch contact member 109 by means of an electromagnet 119 arranged in an electric circuit 120 with a limit switch 121. As a result, closing the limit switch 121 energizes the electromagnet 119 and releases the latch 108 to permit the switch 106 to open the circuit 107. Opening of the circuit 107 deenergizes the electromagnet 90 and permits the spring 94 to operate the valve 81 to move the indexing pawl into registration with the next adjacent tooth on the rack bar 51.

In the present instance, the limit switch 118 is closed immediately after the start of the indexing movement so that the carriage lock 62 is free to drop into engagement with one of the teeth on the rack bar as soon as the carriage is indexed. The limit switches 118 and 121 are successively operated in timed relationship by a fluid motor 122 comprising a cylinder 123 and a piston 124 reciprocably mounted in the cylinder. The piston 124 is connected to a slide 125 having a cam portion 126 effective upon movement of the slide in the direction of the arrow 127 to successively engage the switch operating plungers 128 and 129 spaced from each other along the path of travel of the slide. The switch operating plunger 128 is provided with a pivotally mounted cam 130 responsive to downward movement of the slide 125 to close the limit switch 118 and adapted to be returned to its normal position upon upward movement of the slide 128 by a suitable spring 131. The switch operating slide 129 is provided with a similar pivotally mounted cam 132 responsive to downward movement of the slide by the cam 126 to close the limit switch 121 and also adapted to be returned to its initial position by means of a spring 133.

Figure 10:
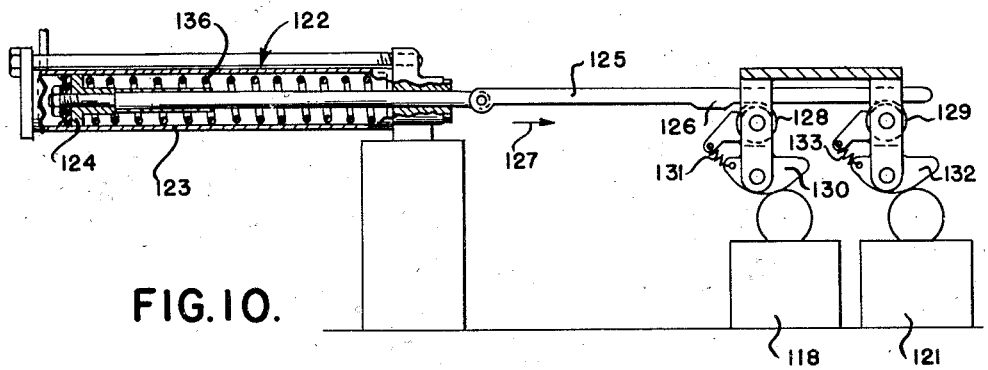
Figure 10 is a side elevational view partly in section of another part of the work carriage control mechanism.

It follows from the above that movement of the slide 125 in the direction of the arrow 127 from the position thereof shown in Figure 10 causes the cam 126 to depress the slide 128 a sufficient distance to permit closing of the limit switch 118 by the cam 130. As stated above, closing the limit switch 118 completes the circuit 117 to the electromagnet 116 and opens the switch 112 to break the circuit 113. Breaking the circuit 113 deenergizes the electromagnet 65 and permits the carriage lock 62 to move into operative engagement with the rack bar 51. As the slide 125 continues its movement in the direction of the arrow 127, the cam 126 depresses the slide 129 and closes the limit switch 121 by the action of the cam 132. As stated above, closing the switch 121 completes the circuit 120 to the electromagnet 119 and the switch 106 is released to open the circuit 107 to the electromagnet 90. The electromagnet 90 operates the valve 81 to move the indexing pawl 48 into engagement with the next adjacent tooth on the pawl 51.

The piston 124 is moved in the direction of the arrow 127 by a fluid under pressure admitted to the indexing motor 41. As shown in Figure 11, a fluid pressure supply line 135 establishes communication between the cylinder 122 and conduit 84. The arrangement is such that regardless of the direction of the power stroke of the piston 43, fluid under pressure is discharged into the cylinder 123 to move the piston 124 in the direction of the arrow 127. The piston 124 is returned to its initial starting position by means of a spring 136 located in the cylinder 123 with the opposite ends respectively engaging the piston 124 and one end wall of the cylinder 123. It follows from the above construction that as soon as the pawl 48 starts movement of the carriage through the rack bar 51, the slide 125 is operated by the fluid motor 122 and the cam 126 successively operates the limit switches 118 and 121 to respectively deenergize the electromagnets 65 and 90. As stated above, deenergization of the electromagnet 65 permits the carriage lock 62 to drop into engagement with the rack, and deenergization of the electromagnet 90 moves the pawl 48 into engagement with the next adjacent tooth on the rack.

In order to simplify handling of the work, provision is made for welding the reinforcing strips 16 to the skin section 15 at spaced points prior to subjecting the work to the automatic indexing mechanism. Operation of the welder to obtain the preliminary welds without effecting the indexing mechanism is obtained by opening the switch 140 shown in Figure 11 of the drawings. The carriage 19 is then moved relative to the table 18 by hand to the positions where it is desired to form a preliminary weld. Upon reference to Figure 1, it will be noted that the carriage 19 is located in the several different positions by means of a plurality of brackets 141 secured to one side of the carriage 19 in spaced relation to each other longitudinally of the table. Upon reference to Figures 5 and 6, it will be noted that each bracket has a recess 142 adapted to receive a pin 143 extending laterally from the upper end of a vertical slide 144. The slide 144 is mounted upon the table 18 and may be secured in a lower position out of interference with the brackets 141 by means of a clamp 145. It will, of course, be understood that the slide 144 is clamped in its lower position when the carriage is automatically indexed by the mechanism previously described.

When making the preliminary welds, the operator merely moves the carriage 19 relative to the table to successively register the slide 144 on the table with the brackets 141. When the carriage has been moved to a position wherein the slide 144 registers with one of the brackets 141, the clamp 145 is released to permit the pin 143 on the slide to engage in the recess 142 of the bracket. As a result, the carriage is locked in this position and the welder is operated to effect a weld. This procedure is repeated at each bracket 141 so that a plurality of relatively widely spaced welds are obtained to initially secure the reinforcing ribs 16 to the skin section 15. It will, of course, be understood that when the carriage is moved to the end of its path of travel in one direction, the end cradles 25 and 26 are shifted laterally relative to the carriage 19 to align another reinforcing rib attaching flange 17 with the welder electrodes. The carriage is then moved in the opposite direction to positions determined by the brackets 141, and the welder is operated in each of said positions. The above procedure is repeated until all of the reinforcing ribs are attached to the skin section 15.

When the preliminary welds are completed, the switch 140 is closed and the carriage 19 is automatically indexed to provide the desired closely spaced welds. In order that the welds obtained during the automatic indexing of the carriage will not overlap the preliminary welds, a plurality of limit switches 146 are secured to the side of the table. One limit switch is positioned on the table opposite each bracket 141 and these switches are successively automatically opened by a projection 147 mounted on the carriage 19. The limit switches 146 are shown in Figure 11 as connected in series with the welding circuit 76 so that as each switch is opened by the projection 147, the welding circuit is broken and the welder is rendered inoperative to weld the work. It may be pointed out at this time that the switches 146 may be shunted out of the welding circuit by closing a switch 150 and this switch is closed when making the preliminary welds in order to prevent the operation of the switches 146 from having any effect on the welder.

In Figure 12 of the drawings, I have illustrated a diagram of one type of welder that may be successfully used in connection with the feature previously discussed. As shown in Figure 12, the electrode 73 is moved toward and away from the electrode 72 by means of a fluid motor 151 comprising a cylinder 152 and a piston 153 reciprocably mounted in the cylinder. The piston 153 is connected to the electrode carrying head 74 so that the latter and associated electrode 73 move as a unit with the piston. The lower end of the cylinder 152 communicates with a fluid pressure supply line 154 and the upper end of the cylinder communicates with the fluid pressure supply line 154 through the medium of a passage 155 and a control valve 156. It may be pointed out at this time that the area of the piston 153 exposed to the action of the fluid under pressure discharged into the cylinder 152 by the passage 155 is greater than the area of the piston exposed to the action of the fluid under pressure admitted to the lower end of the cylinder through the passage 154. As a result, when fluid under pressure is admitted to the upper end of the cylinder, the piston 153 is moved downwardly against the action of the fluid pressure in the lower end of the cylinder beneath the piston.

The control valve 156 is moved to its open position shown in Figure 12 by an electromagnet 158 having a coil 159 located in a circuit 160 with a foot operated switch 161. The arrangement is such that closing the circuit 160 by the switch 161 energizes the coil 159 of the electromagnet 158 to open the control valve 156. It may be pointed out that provision is also made to periodically operate the control valve 156 in timed relation to the operation of the indexing mechanism. This is accomplished by providing an automatic switch 162 in the circuit 160 and this switch is set to close the circuit 160 independently of the switch 161 each time the carriage 19 is indexed.

Movement of either of the switches 161 or 162 to their closed positions admits fluid under pressure to the upper end of the cylinder 152 through a metering valve 163 arranged in the passage 155. As fluid under pressure builds up in the cylinder 152 above the piston 153, the latter is moved downwardly to engage the electrode 73 with the work to be welded. It will be noted from Figure 12 that the passage 155 also communicates with a pair of control valves 164 and 165 for actuating the latter. The valve 164 controls communication between the cylinder 152 and a fluid supply passage 166 which communicates with the fluid pressure supply at a point between the control valve 156 and the metering valve 163. The valve 165 controls communication between the passage 166 and the switch 79 in the welding circuit 76.

The valve 165 is adjusted to open prior to the valve 164 and establishes communication between one side of the switch 79 and fluid pressure supply through the medium of a passage 167 and a metering valve 168. The valves 165 and 168 are adjusted to effect closing of the switch 79 after the electrodes are relatively moved into clamping engagement with the work to be welded.

The valve 164 is adjusted to move to its open position at a predetermined point during the welding period and admits fluid under pressure to the upper end of the cylinder 152 directly from the source of fluid pressure supply. This additional fluid under pressure produces the necessary forging of the work to provide an effective weld and the valve 164 is adjusted to obtain this forging pressure at the most advantageous point in the welding period.

It will also be observed from Figure 12 that the passage 167 communicates with an accumulating chamber 169 through the medium of a metering valve 170. The accumulating chamber 169 communicates with the opposite end of the switch 79 and serves to open the latter when the pressure in the accumulating chamber exceeds a value determined by the setting of the metering valve 170. As a result, the duration of the welding period may be accurately controlled by adjusting the metering valve 170.

Referring again to Figure 12, it will be noted that the control valve 156 is closed by fluid under pressure from an accumulating chamber 171 which communicates with the upper end of the cylinder 152 through the medium of a passage 172 and through the medium of a metering valve 173 located in the passage 172. As a result of this construction, the piston of the control valve 156 is moved to a position wherein the fluid pressure supply line is closed and wherein the several instrumentalities of the welder are connected to the exhaust 174. It may be pointed out that exhausting of the several instrumentalities of the welder is facilitated by an exhaust valve 175 having an exhaust port 176 adapted to be opened by the fluid under pressure in the upper end of the cylinder 152. It will, of course, be understood that when the upper end of the cylinder 152 is exhausted, the piston 153 is moved upwardly by the fluid under pressure supplied to the lower end of the cylinder by the passage 154 and the electrode 73 is retracted from the work. Movement of the electrode 73 in a direction away from the work closes the limit switch 96 and effects operation of the indexing mechanism in the manner previously described.

Operation

The first step in the operation consists in clamping the opposite ends of a skin section 15 to the cradles 25 and 26 respectively. The reinforcing ribs 16 are then located on the skin section 15 in their proper position in the above described manner. The opening 37 in the cradle 25 opposite the end of one of the attaching flanges 17 on one of the reinforcing ribs 16 is registered with the opening 35 in the carriage bracket 33. The pin 38 is then inserted through the registering openings to effect a driving connection between the cradle 25 and the carriage 19. The opening 39 in the cradle 26 adjacent the opposite end of the same attaching flange 17 is registered with the opening 35 in the carriage bracket 34 and the pin 40 is inserted into the registering openings. As a result, one attaching flange on one of the reinforcing ribs 16 is positioned on the longitudinal center line of the carriage 19.

When the parts to be welded are positioned in the manner set forth above, the carriage 19 is moved manually in one direction on the table 18 to the several positions determined by the brackets 141. The carriage is located in each of its positions by raising the slide 144 on the table 18 upward to engage the pin 143 on the slide in the recess 142 in the adjacent bracket 141. At each of these positions, the operator closes the foot switch 161 to weld the registering reinforcing rib to the skin section 15. It may be pointed out that during this operation the switch 140 is opened so that the indexing mechanism will be rendered inoperative and, also, the automatic switch 162 for the welder is rendered inoperative.

The above manual operation is repeated at each position until the carriage has been moved to the end of its travel in one direction. When the carriage has reached the end of its travel in one direction, the cradles 25 and 26 are indexed transversely of the carriage 19 to align another attaching flange 17 with the longitudinal center line of the carriage, and the latter is moved in the opposite direction to the positions determined by the brackets 141. This operation is repeated until each of the reinforcing ribs are secured in their proper positions on the skin section 15.

Upon completion of the preliminary welds referred to above, the switch 140 is closed and switch 162 is rendered operative. As a result, the carriage 19 is automatically indexed to one end of its path of travel by the cooperation of the pawl 48 with the rack bar 51. During the intervals of rest of this step by step movement of the carriage, the automatic switch 162 effects one complete cycle of operation of the welder to produce a weld. When the carriage has been indexed to the end of its travel in one direction, the cradles 25 and 26 are indexed laterally of the carriage to bring another attaching flange 17 on one of the reinforcing ribs 16 in alignment with the longitudinal center line of the carriage. The pawl 48 is then swung to a position wherein the other tooth 49 cooperates with the rack bar to index the carriage in the reverse direction to the opposite end of its path of travel. The welder is, of course, operated during the intervals of rest of the carriage in the reverse direction to effectively weld the registering rib attaching flange to the skin section 15. It may be pointed out at this time that in order to avoid repeating the welding operation when one of the preliminary welds registers with the electrodes, the switch 150 is opened during the automatic indexing of the carriage so that the welding circuit may be opened by the operation of either of the limit switches 146. One limit switch 146 is supported on the table 18 opposite each of the carriage locating brackets 141. Thus, as the preliminary welds successively register with the electrodes, during automatic indexing of the carriage, the switches 146 are successively opened to render the welder inoperative.

It will be understood from the foregoing that by laterally indexing the cradles at the end of each path of travel of the carriage in one direction, each of the attaching flanges on the reinforcing ribs are welded to the skin section 15. In some classes of work, such for example as welding reinforcing ribs on aircraft wing sections, it is necessary to locate the welds in close proximity to each other, and I have discovered that more satisfactory results can be obtained by spacing the welds from each other approximately twice the distance of the specified spacing during one complete cycle of operation. For the purpose of explanation, one cycle of operation will be considered complete when the carriage has been automatically indexed in opposite directions to weld each of the attaching flanges 17 on the reinforcing ribs 16 to the skin section 15. Thus, in order to obtain the specified number of welds, the above cycle of operation is repeated. However, during the second cycle of operation, the rack bar 51 is longitudinally adjusted relative to the carriage 19 so that the second series of welds will be made intermediate the welds of the first series. Thus, it will be apparent that in the specific embodiment of the invention, two cycles of operation are necessary to complete the aircraft wing section, although it will be understood that the second cycle may be eliminated by reducing the spacing between adjacent teeth on the rack bar. Also, in some classes of work it may not be necessary to have the welds in such close relationship and, of course, in cases of this type a second cycle of operation is unnecessary.

What I claim as my invention is:

1. In welding apparatus, a carriage for the work to be welded, a welder having an electrode movable into and out of engagement with the work to be welded, indexing mechanism for moving the carriage by a step by step movement, means for moving the electrode into and out of engagement with the work during the intervals of rest of the carriage, means for locking the carriage in each of the several positions of rest thereof, and means operated by the electrode moving means as the latter moves the electrode away from the work to release the locking means and operate the indexing means.

2. In welding apparatus, a carriage for the work to be welded, a welder having an electrode movable into and out of engagement with the work to be welded, indexing mechanism for moving the carriage relative to the welder by a step by step movement including a cylinder and a piston reciprocably mounted in the cylinder, means for locking the carriage in each of the several positions of rest of the carriage, means for moving the electrode into and out of engagement with the work during the intervals of rest of the carriage, a valve controlling the flow of fluid under pressure to the cylinder for actuating the piston to index the carriage, and means operated by the electrode moving means as the electrode is moved in a direction away from the work to release said locking means and to open the valve to admit fluid under pressure to the indexing cylinder.

3. In welding apparatus, a carriage for the work to be welded, a welder having an electrode movable into and out of engagement with the work, indexing mechanism for moving the carriage by a step by step movement including a cylinder and a piston reciprocably mounted in the cylinder, a valve controlling the flow of fluid under pressure to the cylinder, an electromagnet for operating the valve and connected in an electric circuit, a locking device for holding the carriage in each of the several positions of rest thereof, an electromagnet for releasing the locking device and arranged in an electric circuit, means operable during the intervals of rest of the carriage to move the electrode into and out of engagement with the work, and means responsive to movement of the electrode in a direction away from the work to close the circuit to the electromagnet associated with the locking device for releasing the latter and to close the circuit to the electromagnet associated with the valve for actuating the latter to admit fluid under pressure to the indexing cylinder.

4. In welding apparatus, a carriage for the work to be welded, a welder having an electrode movable into and out of engagement with the work to be welded, indexing mechanism for moving the carriage by a step by step movement including a rack bar mounted on the carriage and having a series of teeth, an indexing pawl coacting with the rack bar to successively move the carriage in opposite directions by a step by step movement, means for moving the electrode into and out of engagement with the work during the intervals of rest of the carriage in both directions of movement of the latter, means operable in timed relation to movement of the electrode into engagement with the work to weld the latter, and means for adjusting the rack bar relative to the carriage to enable offsetting the welds obtained during movement of the carriage in one direction relative to the welds obtained during movement of the carriage in the other direction and thereby provide a row of closely spaced welds.

5. In welding apparatus, a carriage for the work to be welded, a welder having an electrode movable into and out of engagement with the work to be welded, indexing mechanism for moving the carriage by a step by step movement including a rack bar mounted on the carriage and having teeth, a pawl movable in opposite directions to successively engage adjacent teeth on the rack bar and advance the carriage by a step by step movement, a fluid pressure operated motor including a cylinder and a double acting piston connected to the pawl for operating the latter, a valve alternately connecting opposite ends of the cylinder to a source of fluid under pressure and to an exhaust outlet, an electromagnet for operating the valve and arranged in an electric circuit, means operable during the intervals of rest of the carriage to move the electrode into and out of engagement with the work, means responsive to movement of the electrode in a direction away from the work to close the circuit to the electromagnet and effect operation of the valve to move the pawl in a direction to advance the carriage, and means responsive to movement of the carriage by the pawl to open the circuit to the electromagnet and operate the valve to effect movement of the pawl in the opposite direction to engage the next adjacent tooth on said rack.

6. In welding apparatus, a carriage adapted to support parts which have previously been welded at spaced points, a welder having an electrode movable into and out of engagement with the parts to be welded and arranged in an electric circuit, indexing mechanism for moving the carriage relative to the welder by a step by step movement, means operable during the intervals of rest of the carriage for moving the electrode into and out of engagement with the parts on the carriage to produce additional welds, and means for opening the welding circuit each time the carriage is indexed to a position wherein one of the previous welds registers with the electrode.

7. In welding apparatus, a carriage adapted to support parts which have previously been welded together at spaced points, a welder having an electrode movable into and out of engagement with the parts to be welded and arranged in an electric circuit, indexing mechanism for moving the carriage relative to the welder by a step by step movement, means for moving the electrode into and out of engagement with the parts to be welded during the intervals of rest of the carriage, means for closing the electrode circuit in timed relation to movement of the electrode into engagement with the parts to be welded to produce additional welds and for opening said circuit prior to movement of the electrode out of engagement with said parts, a plurality of limit switches arranged in series in the electrode circuit and supported to one side of the path of travel of the parts to be welded in positions opposite the said previous welds, and means for successively opening the limit switches to render the electrode inoperative to weld the parts when the previous welds register with the electrode.

8. In welding apparatus, a carriage for the work to be welded, a welder having an electrode movable into and out of engagement with the work, indexing mechanism for moving the carriage by a step by step movement including a cylinder and a piston reciprocably mounted in the cylinder, a valve having an adjustable member movable in opposite directions to alternately connect opposite ends of the cylinder to a source of fluid under pressure and to an exhaust, an electromagnet connected in an electric circuit for operating the valve member to effect movement of the piston in a direction to advance the carriage, means for moving the electrode into and out of engagement with the work during the intervals of rest of the carriage, means responsive to movement of the electrode in a direction away from the work to close the circuit to the electromagnet and effect movement of the piston in the cylinder in a direction to advance the carriage, and means responsive to movement of the carriage to break the circuit to the electromagnet and permit operation of the valve member to retract the piston in the cylinder.

9. In welding apparatus, a carriage for the work to be welded, a welder having an electrode movable into and out of engagement with the work, indexing mechanism for moving the carriage by a step by step movement including a cylinder and a piston reciprocably mounted in the cylinder, a valve alternatively connecting opposite ends of the cylinder to a source of fluid under pressure and to an exhaust, an electromagnet for operating the valve and connected in an electric circuit, a locking device for holding the carriage in each of the several positions of rest thereof, an electromagnet for releasing the locking device and arranged in an electric circuit, means for moving the electrode into and out of engagement with the work during the intervals of rest of the carriage, means responsive to movement of the electrode in a direction away from the work to close the circuit to the electromagnet associated with the locking device for releasing the latter and to close the circuit to the electromagnet associated with the valve for actuating the latter to effect movement of the piston in the cylinder in a direction to advance the carriage, and means responsive to movement of the carriage for successively opening the circuit to the electromagnet associated with the locking device and to open the circuit to the electromagnet associated with the valve permitting operation of the latter to effect return movement of the piston in said cylinder.

10. In welding apparatus, a carriage for the work to be welded, indexing mechanism for moving the carriage in one direction by a step by step movement and for moving the carriage in the opposite direction by a step by step movement, said indexing mechanism including a rack bar mounted on the carriage and extending in the direction of movement of the latter, an indexing pawl rockably mounted adjacent the rack and having spaced teeth alternately engageable with the rack upon rocking the pawl in opposite directions, means for moving the pawl relative to the rack bar to move the carriage by a step by step movement in one or the other of the directions of movement aforesaid of the carriage depending upon which of the teeth on the pawl is engaged with the rack bar, means for welding the work during intervals of rest of the carriage in each direction of movement of the carriage, and means supporting the rack bar for shifting movement longitudinally of the carriage and relative to the indexing pawl to enable offsetting the welds obtained during movement of the carriage in the said opposite direction with respect to the welds obtained during movement of the carriage in the first named direction.

11. In welding apparatus, a carriage for the work to be welded, indexing mechanism for moving the carriage in one direction by a step by step movement and for moving the carriage in the opposite direction by a step by step movement, means for welding the work during intervals of rest of the carriage in each direction of movement of the carriage, and means for adjusting the indexing mechanism at the end of the indexing movement of the carriage in one direction to register with said welding means zones on the work intermediate the welds previously obtained during movement of the carriage in the said one direction as the carriage is indexed in the opposite direction to thereby provide a row of closely spaced welds.

12. In welding apparatus, a carriage for the work to be welded, indexing mechanism for moving the carriage step by step, said indexing mechanism including rack teeth on the carriage, an indexing pawl cooperating with the rack teeth on the carriage to move the latter a predetermined distance in one direction step by step and to subsequently move the carriage in the opposite direction step by step, means operable during the intervals of rest of the carriage in both directions of movement thereof to weld the work on the carriage, and means for relatively adjusting the rack teeth and pawl at the end of the indexing movement of the carriage in one direction to register with the welding means zones on the work intermediate the welds previously obtained during movement of the carriage in said one direction as the carriage is indexed in the opposite direction to thereby provide a row of closely spaced welds.

13. In welding apparatus, a carriage for the work to be welded, a welder having an electrode movable into and out of engagement with the work to be welded, indexing mechanism for moving the carriage step by step including rack teeth on the carriage, a pawl movable in opposite directions relative to the rack teeth to successively engage adjacent teeth and advance the carriage by a step by step movement, means for moving the electrode into and out of engagement with the work during the intervals of rest of the carriage, means operated by the electrode moving means as the latter moves the electrode in a direction away from the work to move the pawl in a direction to advance the carriage, and means responsive to movement of the carriage by the pawl to effect a movement of the pawl in the opposite direction to engage the next adjacent tooth on the carriage.

14. In welding apparatus, a carriage for the work to be welded, a welder having an electrode movable into and out of engagement with the work to be welded, indexing mechanism for moving the carriage step by step including rack teeth on the carriage, a pawl movable in opposite directions to successively engage adjacent teeth on the carriage and advance the latter by a step by step movement, fluid pressure operated means for moving the pawl in opposite directions, means for moving the electrode into and out of engagement with the work during the intervals of rest of the carriage, a valve for controlling the fluid pressure operated means and responsive to movement of the electrode in a direction away from the work to effect movement of the pawl in a direction to advance the carriage, and means controlled by said valve for operating the latter in timed relation to the advancing movement of the carriage to effect a movement of the pawl in the opposite direction to engage the same with the next adjacent tooth on the rack.

HENRY THOMAS PLATZ.